US012743535B2

(12) United States Patent
Chandwaney et al.

(10) Patent No.: US 12,743,535 B2
(45) Date of Patent: Sep. 22, 2026

(54) ENFORCING COMPLIANCE WITH DATA USE POLICIES

(71) Applicant: Google LLC, Mountain View, CA (US)

(72) Inventors: Ashok Lalchand Chandwaney, Seattle, WA (US); Cindy Zhou, New York, NY (US); Branden Michael Archer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 98 days.

(21) Appl. No.: 18/421,641

(22) Filed: Jan. 24, 2024

(65) Prior Publication Data

US 2025/0238538 A1 Jul. 24, 2025

(51) Int. Cl.
*G06F 21/62* (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS

2006/0136985 A1* 6/2006 Ashley ................ H04L 63/0407 726/1
2019/0018985 A1* 1/2019 Rolle ...................... G06F 21/71

OTHER PUBLICATIONS

"Java Generated Code Guide", Source 1: https://protobuf.dev/reference/java/java-generated/ Source 2: https://protobuf.dev/getting-started/javatutorial/, Sep. 13, 2021, 28 pages.
"Solution: Trim a Binary Search Tree", https://dev.to/seanpgallivan/solution-trim-a-binary-search-tree-8ea, Feb. 5, 2021, 6 pages.
"What is Meta Data?", Retrieved at: https://www.javatpoint.com/what-is-meta-data—on Sep. 29, 2023, 13 pages.

* cited by examiner

*Primary Examiner* — Brandon Hoffman
(74) *Attorney, Agent, or Firm* — Colby Nipper PLLC

(57) ABSTRACT

This document discloses aspects of enforcing compliance of data use policies. In aspects, a network function receives, from an application, a message that includes data to upload from a device. In response, the network function executes a compliance function associated with a type of the data in the message. The compliance function can assert a data use policy based on a state (e.g., populated) of a field of the data and determine whether a user of the device has accepted the data use policy asserted for the data in the message. The compliance function can allow the upload of the data from the device based on compliance with the data use policy or blocks the upload of the data based on a lack of compliance with the data use policy. By so doing, the compliance function can ensure that data uploaded from the device complies with user-accepted data use policies.

20 Claims, 9 Drawing Sheets

800

Proto Files
302

Data
Definition
504

Generated
Runtime Code
410

114

Upload
Data Msg
502

Network
Library
506

Allow
Upload
510

Server
512

Reject
Upload
508

On-Device Runtime
308

Receive a message from an application to upload data from a device
602

Execute, in response to the request, a compliance function associated with a type of the data received from the application
604

Assert, by the compliance function, a data use policy based on a state of a field of the data in the message
606

Determine, by the compliance function, whether a user of the device has accepted the data use policy asserted for the data in the message
608

Allow the upload of the data based on compliance with the accepted data use policy
610

Block the upload of the data based on lack of compliance with the accepted data use policy
612

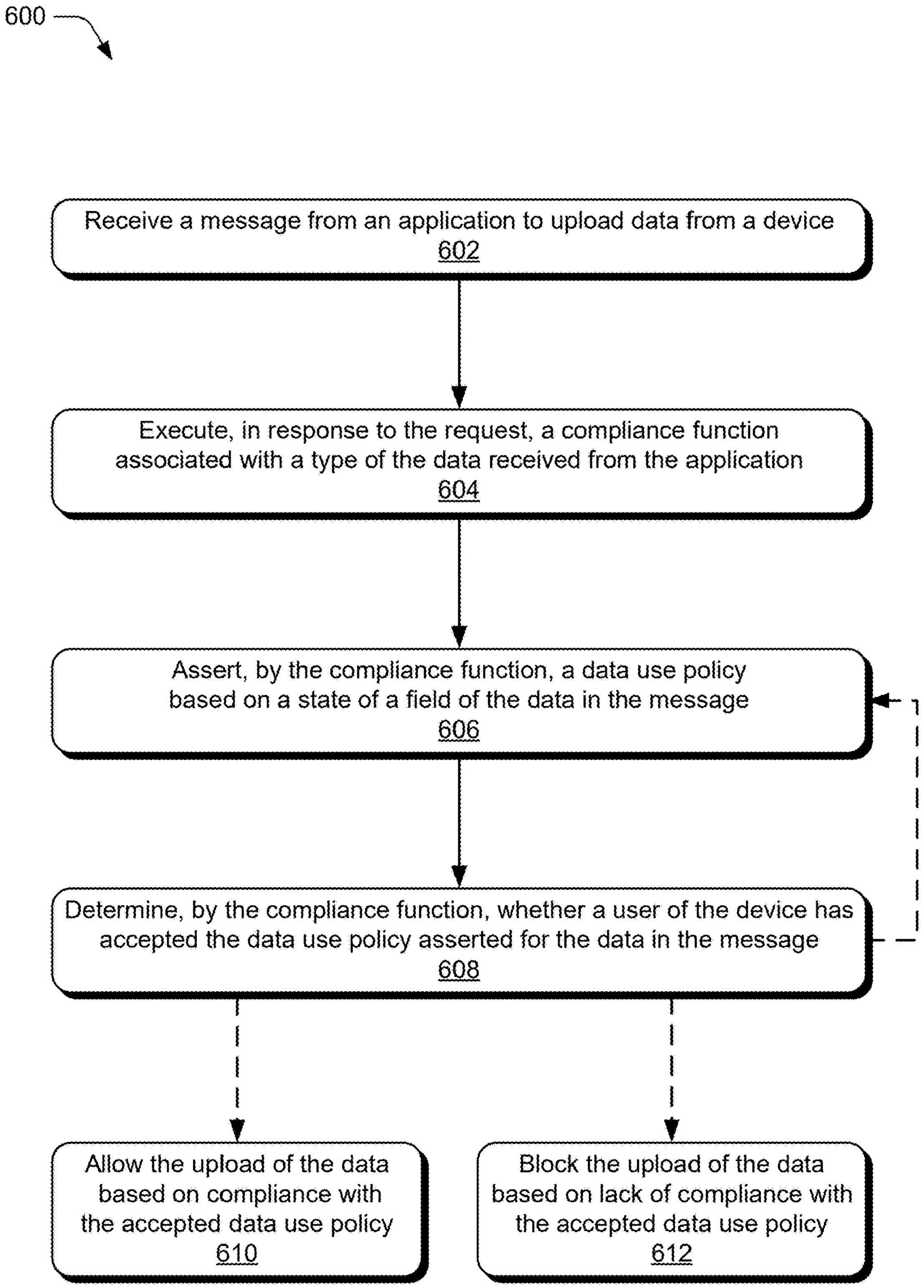

*Fig. 6*

Receive a request from an application to upload data
702

Call, in response to the request, a compliance method associated with a type of the data
704

Determine, using the compliance method, which notices, controls, or consents (NCCs) apply to the upload request based on respective properties of fields of the data
706

Determine whether a user has accepted the NCC that applies to the field of the data
708

Allow the upload of the data field based on compliance with the applicable NCC
710

Prevent the upload of the data field based on lack of compliance with the applicable NCC
712

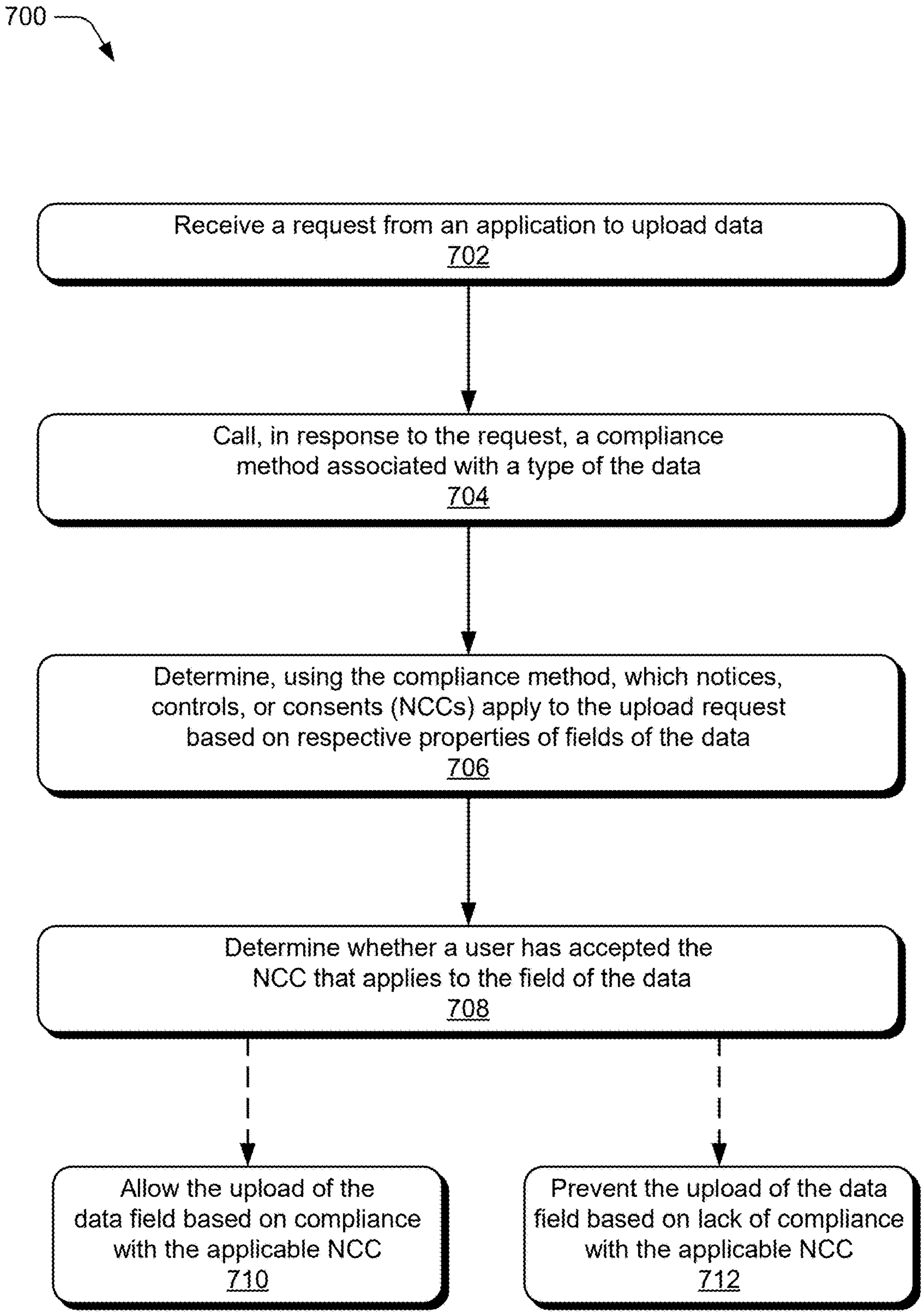

*Fig. 7*

Identify proto files that include data annotations for NCCs of data structures of the proto files
902

Parse the annotations for the NCCs to provide compliance traits for the data structures of the proto files
904

Prune redundant compliance traits for the data structures of the proto files
906

Generate, based on the pruned compliance traits, runtime classes with methods that are executable on a device to enforce the NCCs of the data structures
908

Incorporate the generated runtime classes into a library that is configured to execute on the device when uploading one of the data structures
910

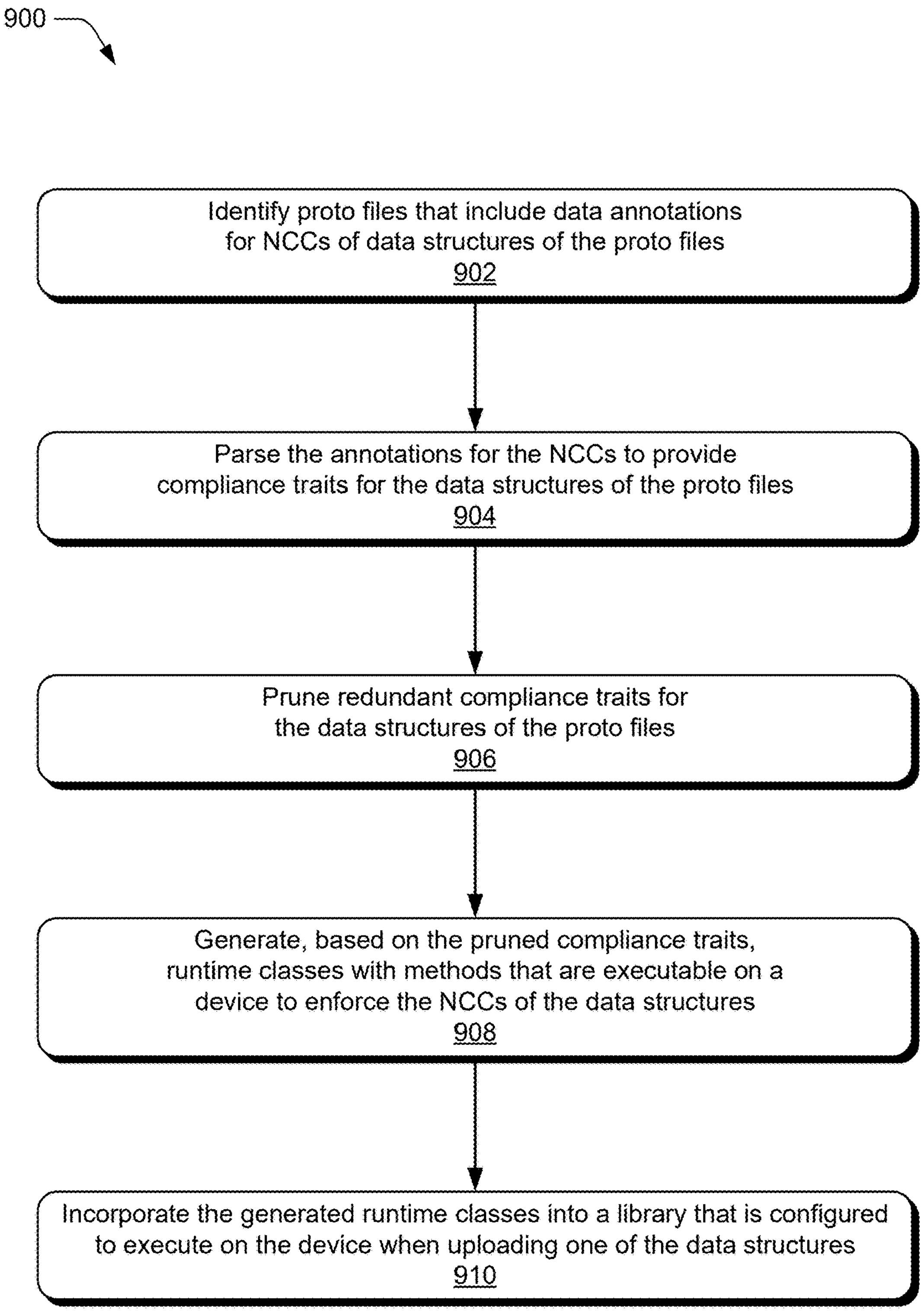

*Fig. 9*

ENFORCING COMPLIANCE WITH DATA USE POLICIES

BACKGROUND

Software service providers, such as cloud computing providers, often have numerous notices, consents, and controls (NCCs) that apply to collection and use of user-related data. When developing applications, software engineers are often required to incorporate and comply with terms of these NCCs to ensure that users are provided appropriate notice and solicited for consent to allow an application to collect, use, or communicate user-related data. Due to the large number and complexity of NCCs that apply to data exposed by an application, however, software engineers are typically unable to comprehend the entirety of all applicable NCCs, which parts of the NCCs should be checked, and how to resolve duplicate or conflicting NCCs. As such, adopting, tracking, and complying with large numbers of complex NCCs can be infeasible for software engineers, particularly when NCCs change or update after the deployment of software applications.

SUMMARY

This document describes apparatuses and techniques for enforcing compliance of data use policies on a device. In some aspects, a network library of a device receives, from an application, a message that includes data to upload from the device. In response to receiving the message, the network library executes a compliance function associated with a type (e.g., container or structure) of the data in the message. The compliance function can assert a data use policy, such as a notice, control, or consent (NCC), based on a state of a field of the data and determine whether a user of the device has accepted the data use policy asserted for the data in the message. The compliance function then allows the upload of the data from the device based on compliance with the data use policy accepted by the user or blocks the upload of the data based on lack of compliance with the data use policy. In aspects, the compliance function may assert and check user acceptance of NCCs of message contents on a field-by-field basis to allow uploads of only data compliant with the NCCs accepted by the user. By so doing, the compliance function can ensure that data uploaded from the device complies with user-accepted data use policies.

This Summary is provided to introduce simplified concepts for enforcing compliance of data use policies on a device, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of enforcing compliance with data use policies are described throughout the disclosure with reference to the Drawings. The use of the same reference numbers in different instances in the description and the figures indicates same or similar elements:

FIG. 6 illustrates an example method for enforcing compliance with data use policies in accordance with one or more aspects;

FIG. 7 illustrates an example method for enforcing compliance of upload data with NCCs accepted by a user;

FIG. 9 illustrates an example method for generating runtime classes with methods for enforcing compliance with data use policies.

DETAILED DESCRIPTION

Figure 1:
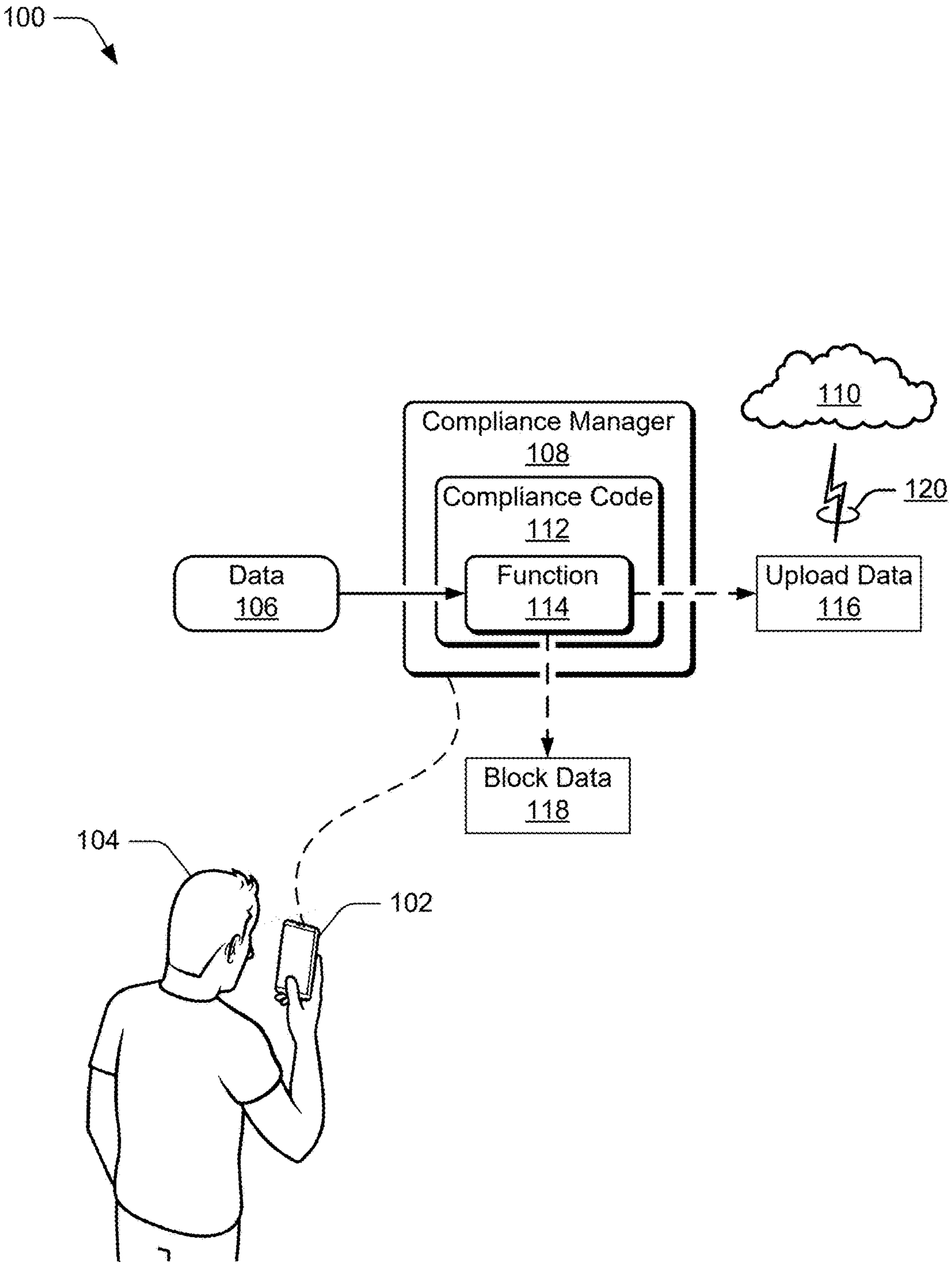
FIG. 1 illustrates an example operating environment in which aspects of enforcing compliance with data use policies can be implemented.

Cloud computing service providers often have numerous notices, consents, and controls (NCCs), which include various conditions and justifications for applications of a client device to upload given pieces of information to servers operated by the provider. As part of application development, software engineers are often required to incorporate and comply with terms of NCCs to ensure that users are provided appropriate notice and solicited for consent to allow an application to collect, use, or communicate user-related data. Due to the large number and complexity of NCCs that apply to data exposed by an application, however, software engineers are typically unable to comprehend the entirety of all applicable NCCs, which parts of the NCCs should be checked, and how to resolve duplicate or conflicting NCCs. Existing NCC checking tools also fail to address these issues, being limited to a single NCC, which results in a lack of a comprehensive NCC check. Because of this lack, existing NCC checking tools may permit violation of other NCCs or downstream conditions. In addition, the existing NCC checking tools may track values of specific NCCs at upload time but not produce any actionable information to track or correct failed NCC compliance. As such, preceding NCC checking tools are heavily reliant on application developers, are overly complex, often overlap, and result in too many edge cases to track.

In contrast with preceding techniques, this disclosure describes aspects of enforcing compliance with data use policies (e.g., NCCs). The described aspects may implement compliance code or a compliance function on a device that evaluates data of a requested upload to determine which NCCs apply to the data and whether the upload of the data is in compliance with NCCs accepted by a user of the device. To do so, the aspects define a process for obtaining structured information about which NCCs data are collected under. In some implementations, the NCCs are described as part of a data format configuration file (e.g., proto file) in a structured fashion using code. From this code describing the NCCs, a compliance function or compliant method can be generated for deployment to a device. Prior to initiating an upload of data from the device, the compliance function can determine whether the upload of the data is in compliance with the NCCs of the device. If the data complies with the NCCs, the compliance function allows the upload of the data and persists metadata relating to the reasons for data collection to ensure compliant downstream usage of data.

Conversely, if the data does not comply with the NCCs, the compliance function prevents the upload of the data and generates indicators associated with the blocked upload for review by an appropriate developer team. By so doing, the aspects remove the burden of enforcing NCC compliance from the software development team and perform compliance enforcement automatically through the implementation of the on-device compliance function or compliance code. Generally, the described techniques improve compliance with NCCs by helping to ensure that the device uploads only compliant data and that data uploaded from the device is handled downstream in compliance by persisting relevant NCC metadata along with the data uploaded from the device.

In some aspects, a network library of a device receives, from an application, a message that includes data to upload from the device. In response to receiving the message, the network library executes a compliance function associated with a type (e.g., container or structure) of the data in the message. The compliance function can assert a data use policy, such as a notice, control, or consent (NCC), based on a state of one or more fields of the data and determine whether a user of the device has accepted the data use policy asserted for the data in the message. The compliance function then allows the upload of the data from the device based on compliance with the data use policy accepted by the user or blocks the upload of the data based on lack of compliance with the data use policy. By so doing, the compliance function can help to ensure that data uploaded from the device complies with user-accepted data use policies.

This document describes apparatuses and techniques for enforcing compliance with data use policies, which may ensure compliant collection or downstream usage of data. The following discussion describes an operating environment, example implementations of various compliance functions, and example methods that may be implemented to enforce compliance with data use policies. In the context of the present disclosure, reference is made to the operating environment by way of example only.

Example Environment

FIG. 1 illustrates an example environment 100 in which a computing device 102 may implement aspects of enforcing compliance with data use policies (e.g., NCCs). As illustrated, a user 104 of the computing device 102 may interact with various applications executing on the computing device 102, shown here as a smart-phone. For example, the user 104 may interact with a user interface of an application through a touchscreen interface of the computing device 102 to provide user input. The application of the computing device 102 may obtain or generate data 106, which may include user-related data that indicates user activity, application telemetry, device information, or the like. The data can include any suitable type of data, which may describe hardware an application is running on, versions of software that are running on the device, user-selected setting values and other state information, configuration information that governs how an application will run, a state and expiration date of software licenses that the user has, information on a user's account, user generated content, security related information, and so forth. Generally, the application may collect the data 106 and send a request to a compliance manager 108 of the computing device 102 to upload the data 106 from the device to a cloud service 110 or remote server associated with the application.

In aspects, the compliance manager 108 includes compliance code 112 from which a compliance function (function 114) or compliance method (not shown) can be executed in response to upload requests or upload messages. The compliance manager 108 may be implemented as part of a network library, an operating system of a device, or an application of the device (e.g., multiple applications with respective instances of a compliance manager). The compliance code 112 may include multiple functions 114 or methods, which can be selectively executed based on a type of request, message, or data received from an application for upload. As described herein, the compliance code 112 is configured to enforce compliance with data use policies of the computing device 102, which may include NCCs accepted by or noticed to a user of the computing device.

In this example, the function 114 may assert one or more NCCs based on fields of the data 106, which are set or populated by the application. The function 114 may then determine whether the user 104 has accepted an asserted NCC for a given piece of data or information and allow the upload 116 of the piece of the data 106 or block the upload 118 of the piece of information. When the function 114 allows or permits the upload of the data 116, the computing device 102 communicates the data to the cloud service 110 via a communication link 120 of the computing device. Additionally, the function 114 may include or persist metadata indicative of the applicable NCCs with the uploaded data to enable compliant downstream use of the data after upload from the computing device 102.

Figure 2:
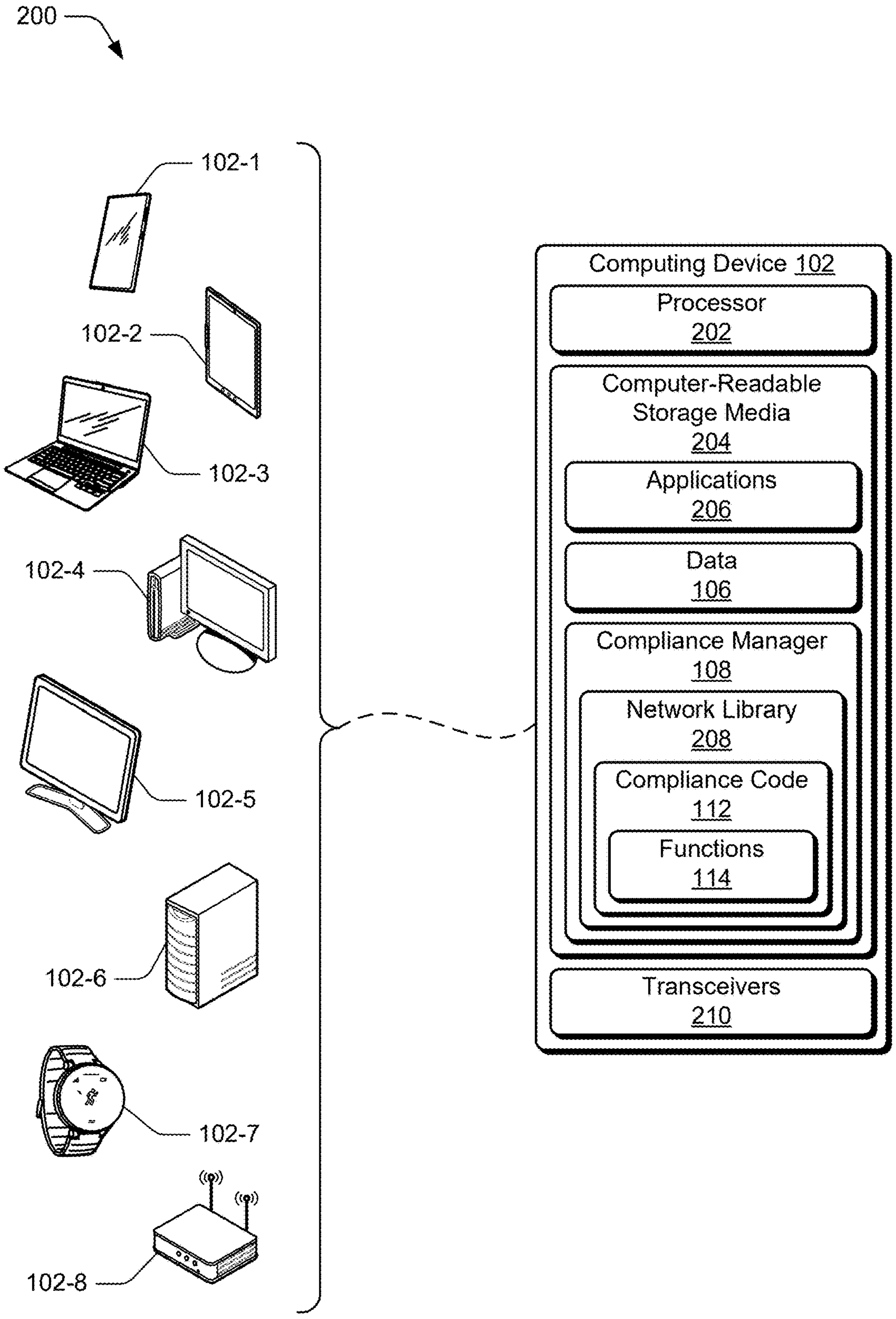
FIG. 2 illustrates example computing devices that can implement aspects of enforcing compliance with data use policies.

FIG. 2 illustrates, at 200, example computing devices 102 that may implement aspects of enforcing compliance with data use policies. The computing device 102 may be implemented as any suitable device, examples of which are illustrated as a smart-phone 102-1, a tablet computer 102-2, a laptop computer 102-3, a gaming console 102-4, a desktop computer 102-5, a server computer 102-6, a wearable computing device 102-7 (e.g., smart-watch), and a broadband router 102-8 (e.g., mobile hotspot). The computing device 102 may also be implemented as any of a mobile station (e.g., fixed- or mobile-STA), a mobile communication device, a user equipment, an entertainment device, a personal media device, a media playback device, a health monitoring device, a drone, a camera, an Internet home appliance capable of wireless Internet access and browsing, an IoT device, and/or other types of electronic devices. The computing device 102 may provide other functions or include components or interfaces, which are omitted from FIG. 2 for the sake of clarity or visual brevity.

The computing device 102 includes a processor 202 and computer-readable storage media 204 (CRM 204), which may include memory media or storage media. The processor 202 may be implemented as a general-purpose processor (e.g., of a multicore central-processing unit (CPU) or application processor (AP)), an application-specific integrated circuit (ASIC), a graphics processing unit (GPU), or a system on chip (SoC) with other components of the computing device 102 integrated therein. The CRM 204 can include any suitable type of memory media or storage media, such as read-only memory (ROM), programmable ROM (PROM), random access memory (RAM), dynamic RAM (DRAM), static RAM (SRAM), or Flash memory. In the context of this discussion, the computer-readable storage media 204 of the computing device 102 is implemented as at least one hardware-based or physical storage device, which does not include transitory signals or carrier waves. Applications 206, firmware, and/or an operating system (not shown) of the computing device 102 can be embodied on the computer-readable storage media 204 as processor-executable instructions, which the processor 202 can execute to provide various functionalities described herein. The computer-readable storage media 204 may also store data 106, such as user data or user media that is accessible through the applications, firmware, or operating system of the computing device 102.

In aspects, the computing device includes the compliance manager 108, which implements aspects of enforcing compliance with data use policies. In this example, the compliance manager 108 includes or is associated with a network library 208 of the computing device 102. The network library 208 may process requests or messages from the applications 206 for communicating data 106 using transceivers 210 of the computing device 102. In some implementations, the network library 208 is configured to call or invoke compliance code 112 in response to receiving a data upload request or message from one of the applications 206. Alternatively, the compliance manager 108 may be implemented as a "wrapper" for the network library, such that when the application wants to send a message, the application first passes the message to the compliance manager. If the compliance manager executes the compliance function on the data and the data is compliant with an applicable NCC, the compliance manager passes the data to the network library for upload. As described herein, the compliance code 112 may include compliance functions 114 (functions 114) and/or compliance methods, which may be selectively called to evaluate data of an upload request for compliance with data use policies and NCCs of the computing device 102.

The computing device 102 may also include a display, input/output ports (I/O ports, not shown), or sensors (not shown). A display may be operably coupled with the processor 202 (e.g., graphics processing unit (GPU)) and configured to graphically present a user interface of an operating system and the applications 206 of the computing device 102. The transceivers 210 can be configured to enable wired or wireless communication of data (e.g., data 106) over respective networks according to any suitable communication protocol. The I/O ports of the computing device 102 may include universal serial bus (USB) ports, coaxial cable ports, and other serial or parallel connectors (including internal connectors) useful to couple the electronic device to various components, peripherals, or accessories such as keyboards, microphones, or cameras.

The computing device 102 may also include sensors, which enable the computing device 102 to sense various properties, variances, stimuli, or characteristics of an environment in which the computing device 102 operates. For example, the sensors may include various position sensors, motion sensors, ambient light sensors, acoustic sensors, capacitive sensors, infrared sensors, temperature sensors, radar sensors, or magnetic sensors. In some cases, the sensors enable interaction with, or receive input from, a user 104 (see FIG. 1) of the computing device 102, such as through touch sensing or proximity sensing.

Figure 3:
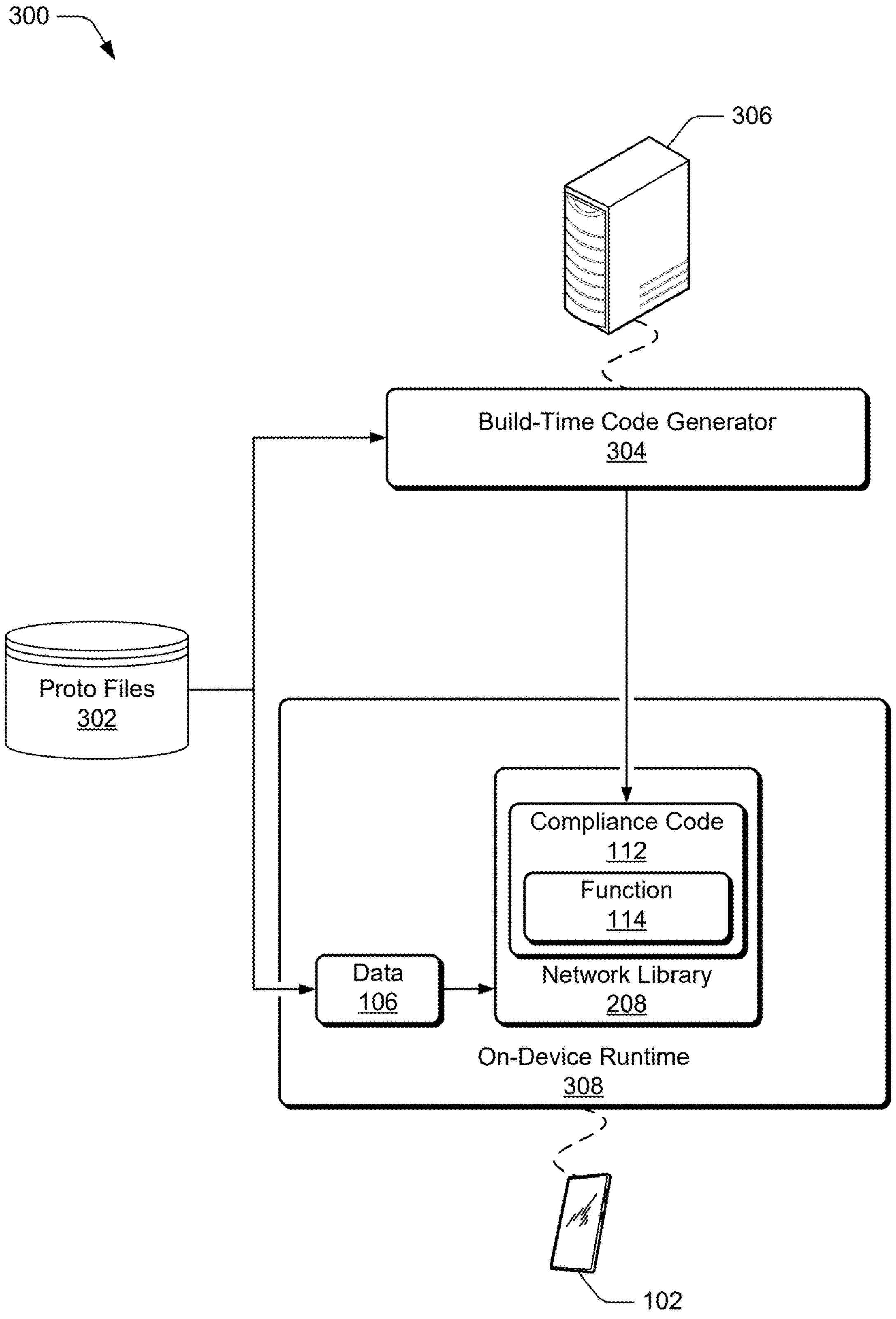
FIG. 3 illustrates an example system for implementing aspects of enforcing compliance with data use policies in accordance with one or more aspects.

FIG. 3 illustrates at 300 an example system for implementing aspects of enforcing compliance with data use policies in accordance with one or more aspects. In aspects, compliance code 112 can be generated using a data configuration file or data schema with descriptions or annotations for data use policies that apply to respective types or pieces of data. The data configuration file or data scheme may be written or declared in a cross-language or language-agnostic platform (e.g., software development package) from which executable code may be compiled into one or more other languages. In this example, proto files 302 of a protocol buffer define cross-platform data structures for use by application developers, including structuring and communication of data by the computing device 102 using executable or runtime code in various languages (e.g., Java™, JavaScript™, C, C++, C#, Go, Python™, Kotlin™, Rust™, Swift™, TypeScript, Objective-C™, Flutter™, etc.). Thus, the proto files 302 may include protocol definition files for data structures along with annotations of compliance properties for the data structures, fields of the data structures, or pieces of information conveyed by the data structures. The annotations may include metadata or description of which NCCs apply to respective fields of a data structure or message, thereby indicating data approved to be collected from a user and/or uploaded from a device to a remote server.

In aspects, the proto files 302 are provided to a build-time code generator 304 (code generator 304), which may be implemented on a server 306 or other computing resources configured to provide executable code based on the proto files 302. The code generator 304 can provide generated code in any suitable language, which may include Java™ code, JavaScript™ code, C code, C++ code, C#code, Go code, Python™ code, Kotlin™ code, Rust™ code, Swift™ code, TypeScript code, Objective-C™ code, Flutter™ code, or the like. The code provided by the code generator 304 may include a static set of files that change when the annotations or metadata of the proto files 302 change or new features are added to the code generator. As shown in FIG. 3, the code generator 304 provides, based on the proto files 302, compliance code 112 that may be provided with or as part of a network library 208 of an on-device runtime 308 of a computing device 102. As described herein, the compliance code 112 and associated functions 114 may be configured to assert and enforce compliance with various NCCs applicable to data an application collects from (or is associated with) a user and that the application attempts to upload from the device. In some cases, the compliance code 112 and functions 114 are configured as a dependency of the on-device network library 208 or a logging library. Accordingly, on the computing device 102 at runtime, the network library 208 or logging library receives data to collect or upload from the device, the network library 208 or logging library may invoke the compliance code 112 to determine whether the collection or upload of the data is compliant (or permissible) with the data use policies (e.g., NCCs) accepted by the user of the device.

Figure 4:
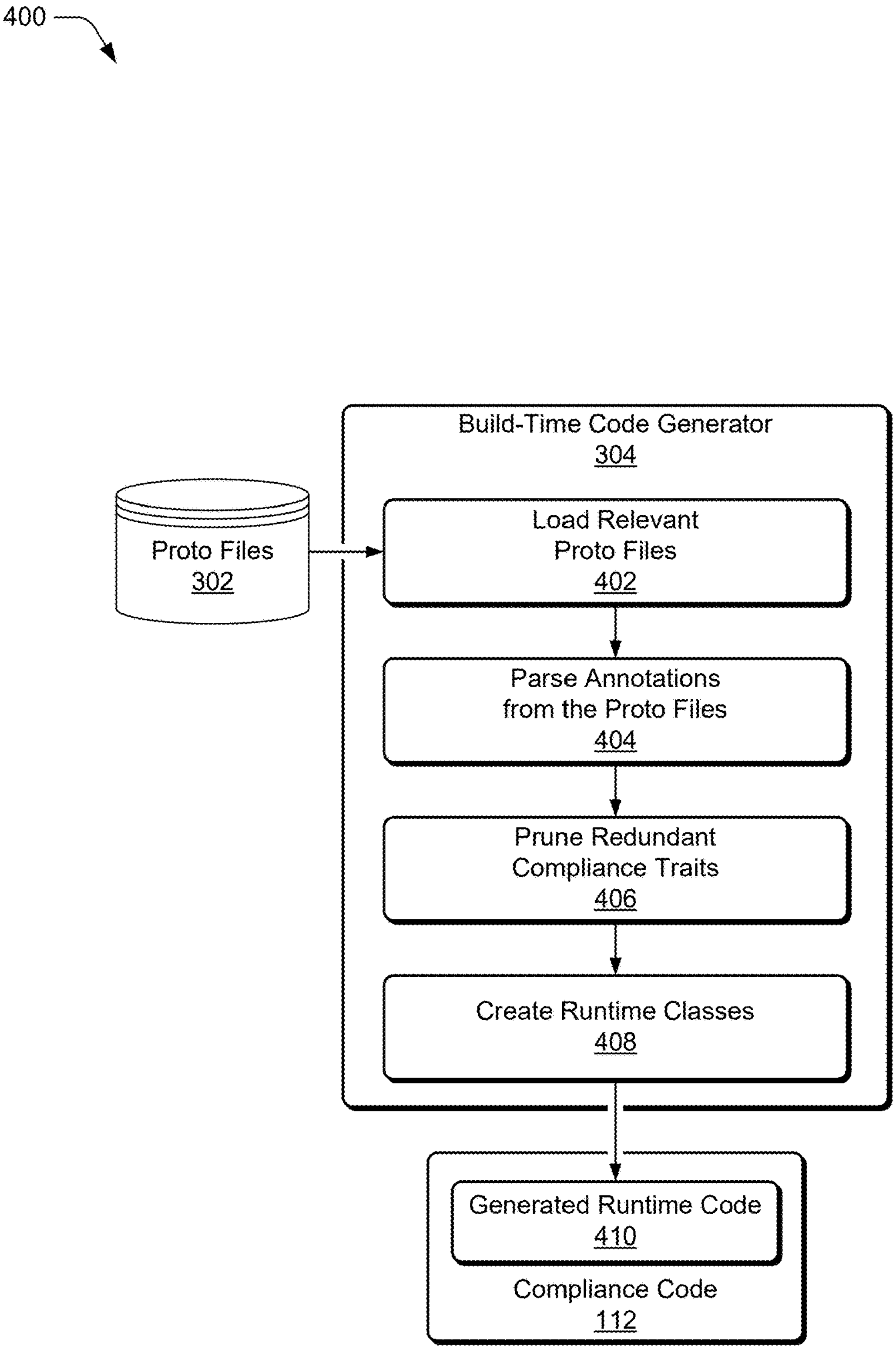
FIG. 4 illustrates an example build-time environment in which compliance runtime code can be generated from proto files.

FIG. 4 illustrates, at 400, an example build-time environment in which compliance runtime code can be generated from proto files. Although described with reference to proto files 302 and runtime code, the code generator 304 may consume any suitable type of data configuration file, data definition file, or data schema to provide code in a programming or a runtime language for enforcing compliance properties of data. At 402, relevant proto files are loaded from the proto files 302 to the code generator 304. In some cases, the relevant proto files are identified or selected based on these proto files including annotations or descriptions of compliance properties of data schemas or data containers.

At 404, the code generator 304 or a language engine can then read through and parse the annotations or descriptions of the proto file's compliance properties (e.g., NCCs associated with respective data fields) to provide compliance traits or compliance descriptors for the data structures of the respective proto files. At 406, the code generator 304 prunes redundant or duplicative compliance traits for the proto files, which may remove duplicate or less-restrictive compliance properties for data formatted in accordance with the proto files. For example, a proto file may produce multiple compliance traits or fields with similar compliance descriptors, and removing the duplicate compliance traits may provide a more-efficient compliance function or method that does not repeatedly check same or similar compliance traits. In some cases, the compliance traits of messages can be mapped as a tree structure, such that the code generator 304 can trim unnecessary nodes off the binary tree structure if determined to be redundant. For example, if a child message has a single data field with a compliance annotation, and that annotation is already applied by its parent, that child node can be trimmed from the tree to avoid testing for the presence of that message entirely. As such, the code generator 304 may effectively unroll an NCC tree of a proto on the server 306 as part of the process to generate the compliance code 112. In some implementations, the code generator 304 uses a proto-performant hasField( ) API function with a maximum of N calls, where N is the size of the proto itself. As an example, consider code segment 1 below in which a consent_A, a notice_B, and a control_C are associated with respective data fields or indices of a message "Example".

```
Message Example {
  repeated int32 foo [required_ncc=CONSENT_A]=1;
  repeated int32 bar [required_ncc=NOTICE_B]=2;
  repeated ExampleSubmessage baz
    [required_ncc=CONTROL_C]=3;
}
```

Code Segment 1: Proto Compliance Traits

At 408, the code generator 304 creates runtime classes from the reduced set of compliance traits for the proto files. In some implementations, the code generator 304 may generate one runtime class of executable code per corresponding proto file. Generally, the runtime classes may include methods that can be called, based on a type of message or data, to assert compliance properties associated with that data and ensure that a user has accepted a data use policy or NCC to which the asserted compliance property corresponds. In other words, the runtime classes or other compliance code are executable to evaluate individual pieces of data or information that an application may collect and attempt to upload to a remote server for compliance with NCCs accepted by the user. In the context of code segment 1, the code generator 304 can automatically generate a runtime class as shown in code segment 2.

```
ExampleMessageNccs {
  public List<NCC> getApplicableNccs(Example proto)
    {
    List<NCC> list=new ArrayList( );
      if (proto.hasFoo( )) {
        list.add(CONSENT_A);
      }
      if (proto.hasBar( )) {
        list.add(NOTICE_B);
      }
      if (list.hasBar( )) {
        list.add(CONTROL_C);
      }
    return list;
  }
}
```

Code Segment 2: Class to Assert Compliance Traits

As another example, a data use policy or NCC may be implemented with three controls, which include CONTROL_1, CONTROL_2, CONTROL_3, where data of a field can be uploaded if both CONTROL_1 and CONTROL_2 are enabled, or if CONTROL_3 is enabled. This logical expression of an NCC could be represented as shown in code segment 3 and applied to a data field as the associated function.

```
repeated int32 foo [required_ncc_or {
  required_ncc_and {
    required_ncc: CONTROL_1 required_ncc: CONTROL_2}
  required_ncc: CONTROL_3}
]=1;
```

Code Segment 3: NCC Logical Expression

At 410, the code generator 304 provides generated runtime code 410 as part of the compliance code 112 that can be incorporated into the on-device runtime 308 or another library of the computing device 102. As described herein, a compliance manager or library of the on-device runtime 308 may call or invoke methods of the generated runtime code 410 to evaluate data that an application attempts to collect and/or upload for compliance with the NCCs accepted or noticed to a user of the device. As part of an NCC update process, when source proto files or data configuration files change (e.g., update) an application developer can rebuild an application with the library (e.g., logging library or network library) or updated runtime code may be dynamically downloaded from a remote server (e.g., service provider) to the device runtime.

Figure 5:
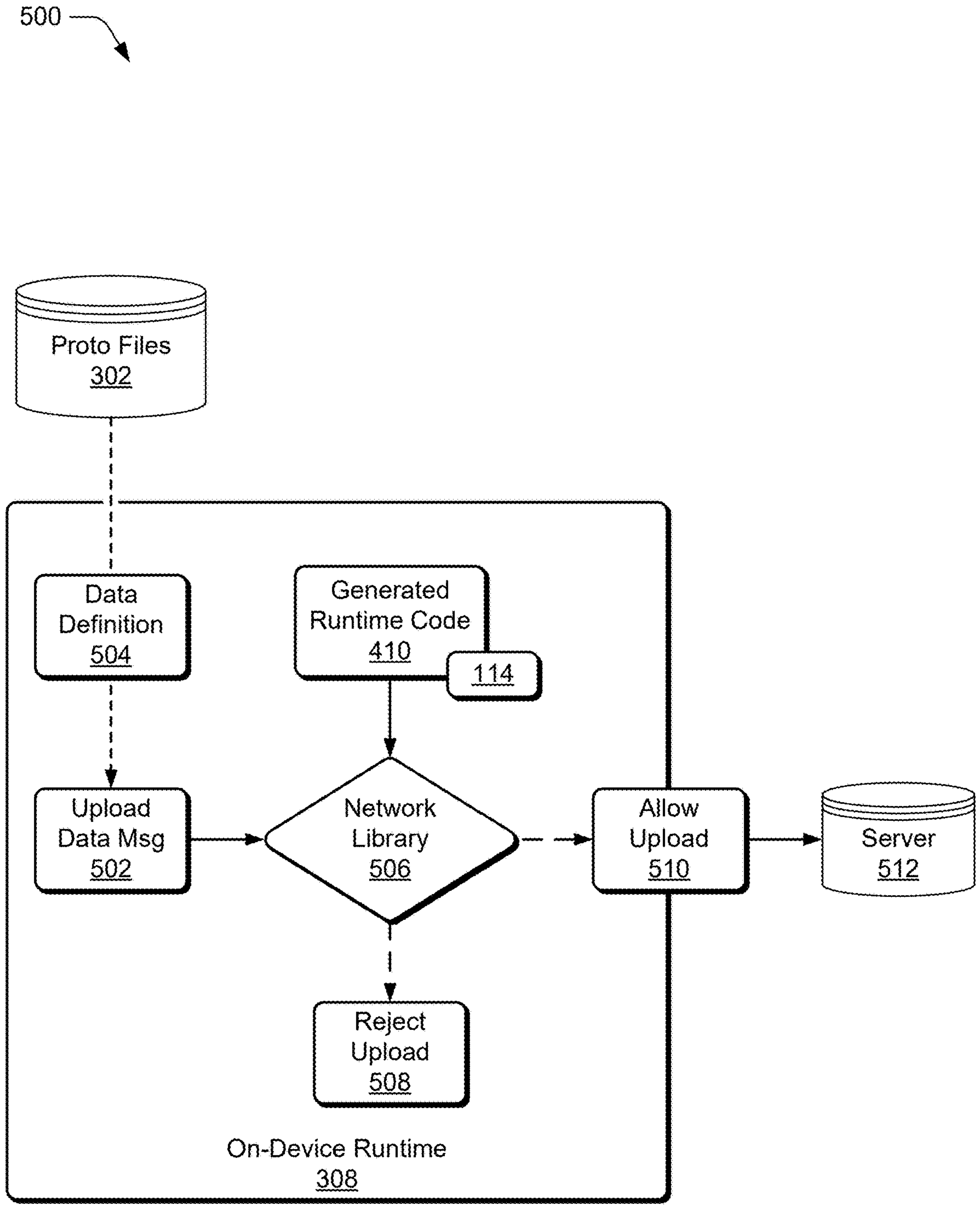
FIG. 5 illustrates an example runtime environment in which runtime code can be implemented to enforce compliance with data use policies.

FIG. 5 illustrates, at 500, an example runtime environment in which runtime code can be implemented to enforce compliance with data use policies. The on-device runtime 308 may be implemented on a computing device 102 and may include a compliance manager 108 to call or invoke compliance code 112. In this example, an application may collect user-related information and create an upload data message 502 with data structured in accordance with a data definition 504 (e.g., schema) as defined by one of the proto files 302. A network library 506 of the computing device 102 manages access to a wired or wireless network configured to support data communication and call functions 114 of the generated runtime code 410 to evaluate data having compliance properties (e.g., subject to NCCs).

As shown in FIG. 5, the network library 506 may receive the upload data message 502 and call a function 114 (or method) from the generated runtime code 410 that corresponds to the proto file 302 of the message type or format. In aspects, the function 114 evaluates the data of the message and determines whether a user of the device has accepted the NCCs corresponding to the compliance properties of the data. If the upload data is not compliant with the NCCs accepted by or noticed to the user (e.g., presented and not opted-out), the function 114 rejects the upload attempt at reject upload 508. Alternatively, if the upload data is compliant with the NCCs, the function 114 allows the upload to proceed at allow upload 510 and the computing device communicates the data of the upload data message 502 to the remote server 512.

Example Methods

Example methods 600 through 900 are described with reference to FIGS. 6-9 in accordance with one or more aspects of enforcing compliance with data use policies. Generally, the methods 600 through 900 illustrate sets of operations (or acts) performed in, but not necessarily limited to, the order or combinations in which the operations are shown herein. Further, any of one or more of the operations may be repeated, combined, reorganized, omitted, or linked to provide a variety of additional and/or alternate methods. In portions of the following discussion, reference may be made to example environment 100 of FIG. 1 and/or entities described with reference to FIGS. 2-5, reference to which is made for example only. The techniques and apparatuses described in this disclosure are not limited to embodiment or performance by one entity or multiple entities operating on one device.

FIG. 6 illustrates an example method 600 for enforcing compliance with data use policies in accordance with one or more aspects. In aspects, operations of the method 600 are implemented by or with a compliance manager 108, compliance code 112, compliance function 114, network library 208, and/or generated runtime code 410.

At 602, a compliance manager receives a message from an application to upload data from a device. The compliance manager may be implemented as part of a logging library or network library of the device. The application can provide the data for upload in a structure associated with a data configuration file or proto file that defines the structure of the data and associated NCCs or compliance properties of the data. The data of the message can include any type of data, which may describe physical properties of the device, an operating system of the device, the application, a library used in the application, information about other applications executing on the device, information regarding an availability of services running on remote servers, and so forth.

At 604, the compliance manager executes, in response to the request, a compliance function associated with a type of data received from the application. In some cases, the network library or logging library of the device invokes the compliance function or a compliance method in response to receiving the message to upload the data from the application. The invocation or call of the compliance function may be implemented automatically based on the application collecting or attempting to upload the data having a structure known to have compliance properties. For example, the compliance manager may invoke the compliance function based on compliance traits of the data of the message.

At 606, the compliance function asserts a data use policy based on a state of a field of the data in the message. For example, the compliance function may assert a data use policy based on a corresponding field of the data being populated or used by the application to convey data to a remote server or cloud service. Alternatively or additionally, the data use policy may include an NCC associated with a type of the message, such that the NCC applies to all data fields of the message. In some implementations, the data use policy may be configured as a logical expression of multiple NCCs relating to one or more fields of the data and/or a type of the message. Thus, the compliance function can be configured to identify a field of data or message to which the data use policy applies based on an NCC annotation or description associated with the data configuration file. The data use policy may include a notice, a consent, or a control relating to the field of the data in the message. In some cases, the data field of the message is configured to convey metrics data, log data, analytics data, trace data, or event data of the application.

At 608, the compliance function determines whether a user of the device has accepted the data use policy asserted for the data in the message. For example, the compliance function may query a list of accepted NCCs to determine whether a piece of data is subject to an NCC compliant or permissible to collect and/or upload. The compliance function may check compliance on a field-by-field basis, such that some data is found in compliance and other data is not in compliance with the accepted data use policies. From operation 608, the method 600 may proceed to operation 610 based on the upload data being in compliance with data use policies accepted by the user or proceed to operation 612 based on the upload data lacking compliance with a data use policy.

Optionally at 610, the compliance function allows the upload of the data based on compliance with the data use policy accepted by the user. The compliance function may allow or permit the upload of the data to proceed via the network library of the device for data in compliance with corresponding data use policies. Optionally at 612, the compliance function blocks the upload of the data based on lack of compliance with the data use policy accepted by the user. In some cases, the compliance function allows upload of data from some fields of the message and blocks the upload of data from other fields of the message based on a lack of compliance. The compliance function may also create, in response to blocking the upload of the data, a record of the blocked upload of the data and associate the record with the message received from the application. This record and its association with the message may later be used by the techniques, which may include reporting to an appropriate application or software development team.

FIG. 7 illustrates an example method 700 for enforcing compliance with NCCs in accordance with one or more aspects. In various aspects, operations of the method 700 are implemented by or with the compliance manager 108, compliance code 112, compliance function 114, network library 208, and/or generated runtime code 410.

At 702, a network library of a device receives a request from an application to upload data. The application may collect and request to upload the data based on a condition of NCCs described in a proto file associated with the application or container of the data to upload. At 704, the network library calls, in response to the request, a compliance method associated with a type of the data of the upload request. The network library or a logging library of the device may be configured to automatically call the method based on the type or a container of the data received from the application. The compliance method may include a method called from generated code configured to enforce compliance of upload data with the NCCs accepted by a user of the device (as described in relation to FIG. 5).

At 706, the compliance method determines which NCCs apply to the upload request based on respective properties of fields of the data. In some cases, the compliance method evaluates the data on a field-by-field basis to determine which NCCs to assert as conditions permitting upload of the data. Alternatively, the NCCs may apply to a type of the message, such that the NCCs apply to a subset or all of the data fields of the message. At 708, the compliance method determines whether a user has accepted the NCC that applies to the field of the data. To do so, the compliance method may query a library or database that indicates which NCCs have been accepted by the user. From operation 708, the method 700 may proceed to operation 710 based on the upload data being in compliance with the NCC applicable to the data or proceed to operation 712 based on the upload data lacking compliance with the NCC applicable to the data.

Optionally at 710, the compliance method allows the upload of the data field based on compliance with the applicable NCC. The compliance method may also associate metadata indicative of the corresponding NCC with the data to enable or ensure compliant use of the data by downstream entities after the data leaves the device. Optionally at 712, the compliance method prevents (or directs prevention of) the upload of the data field based on lack of compliance with the applicable NCC. In aspects, the compliance method may also create, in response to preventing the transmission of the data, a record of the blocked upload and associate the record with the upload request received from the application.

Figure 8:
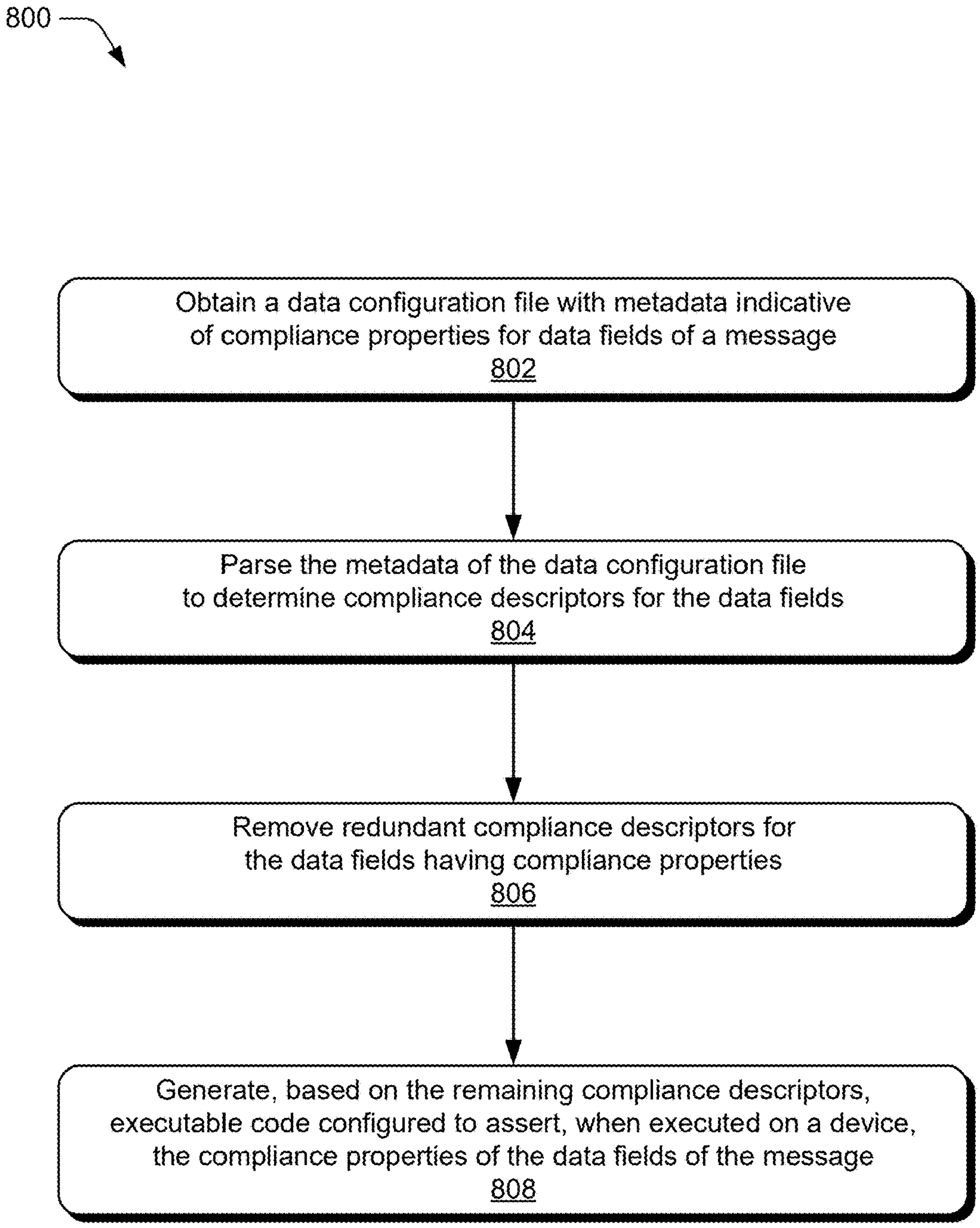
FIG. 8 illustrates an example method for generating code configured to assert compliance properties of data.

FIG. 8 illustrates an example method 800 for generating code configured to assert compliance properties of data. In aspects, operations of the method 800 are implemented by or with proto files 302 and/or a build-time code generator 304 in accordance with one or more aspects.

At 802, a code generator obtains or is provided a data configuration file with metadata indicative of compliance properties for data fields of a message. The data configuration file may include any suitable type of definition file, which may include a protocol definition file (proto file). In aspects, the compliance properties of the data fields indicate a notice, a consent, or a control applicable to a respective one of the data fields of the message. In some cases, multiple data configuration files are obtained, and the code generator identifies a subset of the data configuration files with metadata or annotations indicative of compliance properties for the data.

At 804, the code generator parses the metadata of the data configuration file to determine compliance descriptors for the data fields. In some cases, the code generator parses the metadata or annotations of multiple data configuration files to determine respective compliance descriptors for the data fields of each data configuration or proto file. Generally, the code generator or a natural language engine can read through and parse the annotations or descriptions of the data configuration file's compliance properties (e.g., NCC conditions associated with respective data fields) to provide compliance traits or compliance descriptors for the data structures of the respective proto files.

At 806, the code generator removes redundant compliance descriptors for the data fields having compliance properties. The code generator can prune redundant or duplicative compliance traits for the data configuration file, which may remove duplicate or less restrictive compliance properties for data structured in accordance with the proto file. For example, a proto file may produce multiple compliance traits or fields with similar compliance descriptors, and removing the duplicate compliance traits may provide a more efficient compliance function or compliance method that does not repeatedly check same or similar compliance traits of a message or data structure. Alternatively or additionally, the code generator (e.g., the build-time code generator 304 of FIGS. 3 and 4) can remove compliance descriptors that are redundant or duplicative between data configuration files or parent/child nodes of an NCC tree.

At 808, the code generator generates, based on the remaining compliance descriptors, executable code configured to assert the compliance properties of the data fields of the message. The executable code may include compliance functions or methods that, when executed on a device, enforce the compliance properties of the data fields of the message as a condition of permitting collection and/or communication of the data from the device. In some implementations, the executable code is configured to apply an NCC associated with a type of the message, such that the NCC applies to all data fields of the message. Alternatively or additionally, the executable code may include a logical expression of multiple NCCs relating to one or more fields of the data and/or a type of the message.

FIG. 9 illustrates an example method 900 for generating runtime classes with methods for enforcing compliance with data use policies. In aspects, operations of the method 900 are implemented by or with the proto files 302 and/or the build-time code generator 304 in accordance with one or more aspects.

At 902, a code generator identifies proto files that include data annotations for NCCs of data structures of the proto files. The code generator may identify proto files with annotations or descriptions for NCCs of data for which the proto files can be used. At 904, the code generator parses the annotations for the NCCs to provide compliance traits for the data structures of the proto files. In some implementations, a compliance trait of the data is associated with a data field to which a corresponding NCC applies.

At 906, the code generator prunes redundant compliance traits for the data structures of the proto files. In some cases, the compliance traits of messages can be mapped as a binary tree structure, such that the code generator can trim unnecessary nodes off the binary tree structure if determined to be redundant. For example, if a child message has a single data field with a compliance annotation, and that annotation is already applied by its parent, that child node can be trimmed from the tree to avoid testing for the presence of that message entirely.

At 908, the code generator generates, based on the pruned compliance traits, runtime classes with methods that are executable on a device to enforce the NCCs of the data structures. Generally, the runtime methods can be configured to identify the data fields of the message with the compliance properties and assert those compliance properties against accepted NCCs to determine whether data of a message or upload request complies with the NCCs. At 910, the code generator incorporates the generated runtime classes into a library that is configured to execute on the device when uploading one of the data structures.

Further to the descriptions above, a user may be provided with controls relating to the NCCs or data use policies allowing the user to make an election as to both if and when devices, systems, applications, and/or features described herein may enable collection of user-related data or information, such as one or more of application use metrics, trace files, log files, debug files, event records, a user's current location, a user's location history, browser history, search history, if the user has communicated content or information with a server, or the like.

In addition, certain user-related data collected in compliance with the NCCs or data use policies may be treated in one or more ways before it is stored or used, so that personally identifiable information is removed. For example, a user's identity may be treated so that no personally identifiable information can be determined for the user. For example, a user's geographic location may be generalized or randomized about where location information is obtained (such as to a city, postal code, or state/province level), so that a particular location of a user cannot be determined. Thus, the user may have control(s) over the NCCs that govern what information is collected about the user, one or more devices of the user, how that information is used, what information is uploaded from the device, and/or what information is provided to the user.

CONCLUSION

Although aspects of the described apparatuses and techniques for enforcing compliance with data use policies have been described in language specific to features and/or methods, the subject of the appended claims is, as recited by any of the previous examples, not necessarily limited to the specific features or methods described. Rather, the specific features and methods are disclosed as example implementations of enforcing compliance with data use policies, and other equivalent features and methods are intended to be within the scope of the appended claims. Further, various aspects of enforcing compliance with data use policies are described, and it is to be appreciated that each described aspect can be implemented independently or in connection with one or more other described aspects.

What is claimed is:

1. A method comprising:

receiving, from an application, a message that includes data to upload from a device;

executing, in response to receiving the message, a compliance function associated with a type of the data of the message, the type comprising a data structure or a container of the data, the compliance function configured to enforce compliance of the data of the message with data use policies associated with the type of the data, the compliance function comprising executable code generated based on compliance descriptors defined in a data configuration file associated with the data structure, the compliance descriptors being selected through the parsing of metadata of the data configuration file to determine compliance descriptors for the data fields of the message and removal of a redundant compliance descriptor for one of the data fields of the message to provide a pruned set of compliance descriptors;

identifying, by the compliance function, a field of the data to which the data use policies apply based on the compliance descriptors;

asserting, by the compliance function, one of the data use policies associated with the type of the data based on a state of the field of the data of the message;

determining, by the compliance function, whether a user of the device has accepted the data use policy asserted for the data in the message, the acceptance of the data use policy indicating compliance of the data with the data use policy; and allowing the upload of the data from the device based on the compliance with the data use policy accepted by the user; or blocking the upload of the data from the device based on a lack of compliance with the data use policy.

2. The method as recited in claim 1, wherein the data use policy comprises a notice relating to the field of the data, a consent relating to the field of the data, or a control relating to the field of the data.

3. The method as recited in claim 1, wherein the data use policy comprises:

a notice, a consent, or a control associated with a type of the message and is enforced on the field of the data based on the type of the message; or a logical expression of multiple notices, consents, or controls relating to the field of the data or the type of the message.

4. The method as recited in claim 1, further comprising:

in response to blocking the upload of the data based on the lack of compliance with the data use policy, creating a record of the blocked upload of the data and associating the record with the message received from the application.

5. The method as recited in claim 1, wherein:

the message to upload the data is received by a network library of the device that manages access to a network configured to support data communication; and the network library invokes the compliance function in response to receiving the message to upload the data from the application.

6. The method as recited in claim 1, wherein:

the compliance function is received by a compliance manager of the device; and the compliance manager invokes the compliance function in response to receiving the message to upload the data from the device.

7. The method as recited in claim 1, wherein:

the application provides the data for upload in a structure associated with a data configuration file; and the compliance function is configured to identify the field of data to which the data use policy applies based on a description associated with the data configuration file.

8. The method as recited in claim 7, wherein the data configuration file comprises a protocol definition file.

9. A method comprising:

obtaining a data configuration file with metadata, the metadata indicating compliance properties for data fields of a message;

parsing the metadata of the data configuration file to determine compliance descriptors for the data fields of the message;

removing a redundant compliance descriptor for one of the data fields of the message to provide a pruned set of compliance descriptors; and generating, based on the pruned set of compliance descriptors for the data fields, executable code configured to enforce, when executed on a device, the compliance properties of the data fields of the message as a condition of permitting communication of the message from the device.

10. The method as recited in claim 9, wherein the data configuration file comprises a first data configuration file, the compliance descriptors are first compliance descriptors, and the method further comprises:

obtaining a set of data configuration files of a software development package, the set of data configuration files including the first data configuration file;

identifying a subset of the data configuration files with respective metadata indicating compliance properties for data fields of messages, the subset of data configuration files including the first data configuration file and a second data configuration file;

parsing the metadata of the second data configuration file to determine second compliance descriptors for the data fields; and removing, from the second compliance descriptors, a compliance descriptor for one of the data fields that is redundant with another compliance descriptor of the first compliance descriptors to provide the pruned set of compliance descriptors for use in generating the executable code.

11. The method as recited in claim 9, wherein the compliance properties of the data fields of the message indicate a notice, a consent, or a control applicable to a respective one of the data fields of the message.

12. The method as recited in claim 9, wherein the compliance properties of the data fields of the message comprise:

a notice, a consent, or a control associated with a type of the message that is applicable to the one of the respective data fields based on the type of the message; or a logical expression of multiple notices, consents, or controls that are applicable to the data fields.

13. The method as recited in claim 9, wherein the executable code comprises generated code that includes methods configured to identify the data fields of the message with the compliance properties.

14. The method as recited in claim 13, wherein a programming language of the generated code comprises C, C++, Go, Java™, JavaScript™, Kotlin™, Python™, or Rust™.

15. The method as recited in claim 9, wherein the data configuration file comprises a protocol definition file.

16. A computing device comprising:

a processor;

a data transceiver; and a memory storing processor-executable instructions that, responsive to execution by the processor, implement a compliance manager to:

receive, from an application, a message that includes data for transmission via the data transceiver to a remote server;

invoke, in response to receiving the message, a compliance function associated with a type of the data of the message, the type comprising a data structure or a container of the data, the compliance function configured to enforce compliance of the data of the message with data use policies associated with the type of the data, the compliance function comprising executable code generated based on compliance descriptors defined in a data configuration file associated with the data structure, the compliance descriptors being selected through the parsing of metadata of the data configuration file to determine compliance descriptors for the data fields of the message and removal of a redundant compliance descriptor for one of the data fields of the message to provide a pruned set of compliance descriptors;

identify, by the compliance function, a field of the data to which the data use policies apply based on the compliance descriptors;

assert, via the compliance function, one of the data use policies associated with the type of the data based on a state of the field of the data in the message;

determine, via the compliance function, whether a user of the computing device has accepted the data use policy asserted for the data in the message, the acceptance of the data use policy indicating compliance of the data with the data use policy; and allow the transmission of the data to the remote server based on the compliance with the data use policy accepted by the user; or block the transmission of the data based on a lack of compliance with the data use policy.

17. The computing device as recited in claim 16, wherein the data use policy comprises a notice relating to the field of the data, a consent relating to the field of the data, or a control relating to the field of the data.

18. The computing device as recited in claim 16, wherein the data use policy comprises:

a notice, a consent, or a control relating to a type of the message and is enforced on the field of the data based on the type of the message; or a logical expression of multiple notices, consents, or controls relating to the field of the data or the type of the message.

19. The computing device as recited in claim 16, wherein the compliance function is further configured to:

in response to blocking the transmission of the data based on the lack of compliance with the data use policy, create a record of the blocked transmission of the data and associate the record with the message received from the application.

20. The computing device as recited in claim 16, wherein:

the compliance manager is implemented as part of the application; or the compliance manager is implemented as part of a network library of an on-device runtime of the computing device, the network library configured to manage access to a network configured to support data communication.

* * * * *